O. E. BYRNS.
CHAIN TIGHTENER ATTACHMENT FOR BICYCLES.
APPLICATION FILED NOV. 20, 1919.

1,357,540. Patented Nov. 2, 1920.

Witness

Inventor
O. E. Byrns
By
H. S. Hill
Attorney

UNITED STATES PATENT OFFICE.

ODUS E. BYRNS, OF MUNCIE, INDIANA, ASSIGNOR OF ONE-HALF TO ALBERT TRESLER, OF CHICAGO, ILLINOIS.

CHAIN-TIGHTENER ATTACHMENT FOR BICYCLES.

1,357,540.  Specification of Letters Patent.  Patented Nov. 2, 1920.

Application filed November 20, 1919. Serial No. 339,461.

*To all whom it may concern:*

Be it known that I, ODUS E. BYRNS, a citizen of the United States, residing at Muncie, in the county of Delaware, State of Indiana, have invented a new and useful Chain-Tightener Attachment for Bicycles; and I do hereby declare the following to be a full, clear, and exact description of the invention, such as will enable others skilled in the art to which it appertains to make and use the same.

The present invention relates to a chain tightener for bicycles, and has for its object to provide a device of this character which embodies novel features of construction whereby it can be readily fitted upon the frame of any bicycle and will provide an effective means for taking up any looseness in the chain so that there will be no danger of the chain becoming accidentally disengaged from the sprocket.

Further objects of the invention are to provide a device of this character which is comparatively simple and inexpensive in its construction, which can be applied to a bicycle frame without injuring or marring the same and without necessitating the drilling of any holes therein, and which can be easily and quickly adjusted to produce just the proper degree of tension in the chain.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
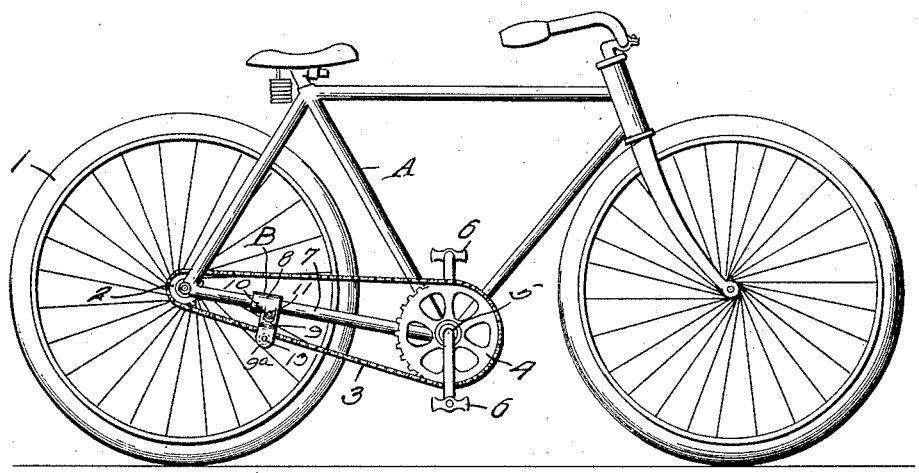
Figure 1 is a side elevation of a bicycle with a chain tightener constructed in accordance with the invention applied thereto.
Figure 2:
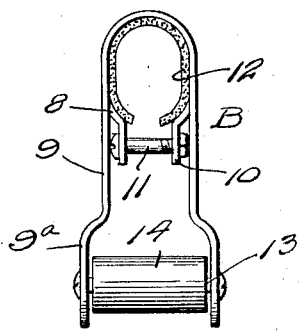
Fig. 2 is an enlarged end elevation of the chain tightener when detached from the frame.
Figure 3:
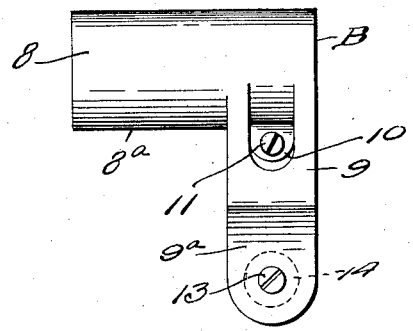
Fig. 3 is a side elevation of the same.

Referring to the drawings, which illustrate one embodiment of the invention, the reference character A designates the frame of a bicycle which is of the conventional construction, the rear wheel 1 of the bicycle being provided with a comparatively small sprocket wheel 2 which is connected by a chain 3 to a larger sprocket wheel 4. This sprocket wheel 4 is rigidly applied to one end of a drive shaft 5, and the pedals 6 are applied to opposite ends of the drive shaft in the usual manner. This is all of the conventional and well-known construction, and no claim to novelty is based thereon. The chain tightener includes an inverted U-shaped bracket B which may be conveniently stamped from sheet metal, and of which the curved end straddles and clamps around the frame bar 7. The curved or closed end of the bracket is formed with a lateral extension 8 which obtains an extended bearing upon the frame and assists in supporting the bracket firmly in position when the device is in use. The side arms of this extension 8 may have the ends $8^a$ thereof curved inwardly toward each other so as to spring around the bar of the bicycle frame and assist in gripping the same. The two main arms 9 of the inverted U-shaped frame or bracket B are shown as having ears 10 stamped therefrom, said ears being connected by a clamping bolt 11 which can be tightened for the purpose of causing the curved or closed end of the bracket to tightly grip the frame bar of the bicycle. If desired, a layer 12 of felt or similar material may be interposed between the bracket B and the bicycle frame, thereby preventing the possibility of scratching or cracking the paint or enamel on the bicycle when applying the chain tightener thereto. The outer or lower ends of the side pieces 9 of the bracket B are flared as indicated at $9^a$ and connected by a removable pivot bolt 13 upon which a roller 14 is mounted.

The bracket is intended to be applied to the bicycle frame, as indicated in Fig. 1, with the arm thereof extending downwardly and the two sides 9 thereof straddling the lower stretch of the sprocket chain 3. The roller 14 is placed in position under the lower stretch of the sprocket chain, and the bracket is then moved longitudinally upon the frame bar of the bicycle to tighten or loosen the chain as may be desired. The bar 7 of the bicycle frame upon which the chain tightener is mounted is horizontally disposed and extends longitudinally between the upper and lower stretches of the sprocket chain, and owing to the fact that the rear sprocket wheel 2 is smaller than the forward sprocket wheel 4, the upper and lower stretches of the sprocket chain converge rearwardly. In other words, the lower stretch of the sprocket chain thus has an inclined relation to the frame bar 7, with the result that by moving the bracket B rearwardly the chain is loosened, while by moving the bracket forwardly the roller 14 is brought into proper engagement with the chain to tighten the same. The bracket B is positioned upon the bicycle frame to obtain the desired tension in the sprocket chain 3, whereupon the clamping bolt 11 is tightened to lock the device rigidly in an adjusted position. Owing to the fact that this clamping bolt 11 connects the ears 10 which are stamped from the sides 9 of the U-shaped frame it will be obvious that this bolt can be tightened and the device clamped in position without interfering with the pivot bolt 13 or causing the roller 8 to be gripped between the ends of the arms 9. The device can be easily and quickly applied to the frame of a bicycle and the adjustment thereof will enable the chain to be held under exactly the proper tension so that it will neither be too tight for a proper working of the sprocket wheels, nor so loose as to be liable to inadvertently jump the sprocket wheel and become disengaged therefrom.

Having thus described the invention, what I claim as new and desire to secure by Letters Patent, is:—

1. A chain tightener for bicycles including a slide adapted to be adjustably mounted on the bar of the bicycle frame which extends between the upper and lower stretches of the chain, a lateral arm projecting from the slide, and a roller journaled upon the lateral arm and engaging the chain, the longitudinal adjustment of the slide on the frame bar enabling the chain to be placed under the desired tension.

2. A chain tightener for bicycles including a U-shaped bracket adapted to straddle and adjustably engage the bar of a bicycle frame which extends between the upper and lower stretches of the chain, the side arms of the U-shaped bracket straddling one of the stretches of the chain, and a roller journaled between the said side arms of the bracket and engaging one of the stretches of the chain whereby the tension of the chain can be adjusted by moving the bracket longitudinally upon the frame bar of the bicycle.

3. A chain tightener for bicycles, including a U-shaped bracket adjustably mounted upon that bar of a bicycle frame which extends between the upper and lower stretches of the chain, the side arms of the bracket straddling one of the stretches of the chain and having tongues stamped therefrom, a clamping bolt connecting the tongues and adapted to clamp the bracket rigidly in an adjusted position upon the frame bar of the bicycle, and a roller journaled between the side arms of the frame and engaging one of the stretches of the chain so that the tension of the chain can be varied by adjusting the position of the bracket on the frame bar of the bicycle.

4. A chain tightener for bicycles including a U-shaped bracket adapted to be adjustably mounted on that bar of a bicycle frame which extends between the upper and lower reaches of the chain, the closed end of the U-shaped bracket engaging the frame bar of the bicycle and being formed with a lateral extension which obtains an extended bearing thereon, and the side arms of the bracket projecting laterally and straddling one of the stretches of the chain, a roller journaled between the said side arms of the bracket and engaging the chain so that by moving the bracket longitudinally upon the frame bar of the bicycle the chain can be tightened or loosened, and means for clamping the bracket rigidly in an adjusted position.

5. A chain tightener for bicycles including a U-shaped bracket adapted to be adjustably mounted on that bar of a bicycle frame which extends between the upper and lower stretches of the chain, the closed end of the bracket engaging the bar and being formed with a lateral extension which obtains an extended bearing thereon, the said arms of the U-shaped bracket projecting laterally and straddling one of the stretches of the chain, said side arms having tongues stamped therefrom, a pivot bolt connecting the side arms, a roller mounted upon the pivot bolt and engaging the chain so that the chain can be tightened or loosened by moving the bracket longitudinally upon the frame bar of the bicycle, and a clamping bolt connecting the tongues for clamping the bracket rigidly in an adjusted position.

In testimony whereof I have signed my name to this specification in the presence of two subscribing witnesses.

ODUS E. BYRNS.

Witnesses:
CLINTON STRADLING,
JOHN BENSON.